United States Patent [19]

Mohan

[11] Patent Number: 4,827,140
[45] Date of Patent: May 2, 1989

[54] PSEUDO SENSOR PITCH MATCH CYCLIC SCANNING SYSTEM

[75] Inventor: William L. Mohan, Barrington, Ill.

[73] Assignee: Spartanics Ltd., Rolling Meadows, Ill.

[21] Appl. No.: 37,740

[22] Filed: Apr. 13, 1987

[51] Int. Cl.$^4$ ............................................. G01N 21/86
[52] U.S. Cl. ................................... 250/548; 250/557
[58] Field of Search ............. 250/548, 557, 561, 202; 377/3, 8, 53; 356/400, 401

[56] References Cited

U.S. PATENT DOCUMENTS

| | | | |
|---|---|---|---|
| Re. 27,869 | 1/1974 | Willits et al. | 250/560 |
| 3,335,281 | 8/1967 | Willits | 250/202 |
| 3,643,098 | 2/1972 | Willits | 250/548 |
| 3,663,803 | 5/1972 | Mohan et al. | 377/3 |
| 3,790,759 | 2/1974 | Mohan et al. | 377/8 |
| 3,813,523 | 5/1974 | Mohan et al. | 377/8 |
| 4,373,135 | 2/1983 | Mohan et al. | 377/8 |
| 4,481,667 | 11/1984 | Price et al. | 377/8 |

*Primary Examiner*—David C. Nelms
*Attorney, Agent, or Firm*—Thomas R. Vigil

[57] ABSTRACT

The method and apparatus are utilized for quickly and accurately positioning a workpiece, which is situated on a movable platform and which has at least one indicia mark thereon having a different sensitivity to a sensing means than an adjacent contrast area, to a position where the indicia mark is in registry with a registration axis. The method includes the steps of: effecting a scan of the sensing means transverse to the registration axis in the area on the workpiece through which the registration axis extends with sensing means that are capable of generating electrical signals related to what is sensed; providing in the sensing means a sensor system which can function as one or two sensors, real or pseudo; processing the electrical signals generated by the sensing systems in a manner whereby some of the signals are treated as the scan data of a first sensor, real or pseudo, and the other of the signals are treated as the scan data of a second sensor, real or pseudo; setting the effective width of the sensor system at rest to be no greater than slightly greater than the width of the indicia mark; setting the amplitude of the scan which is effected transversely of the indicia mark when the indicia mark is close to the registration axis to be substantially equal to a real or pseudo single sensor width and about a center axis of the sensing means; and setting the center axis of the sensing means in registration with the registration axis.

28 Claims, 13 Drawing Sheets

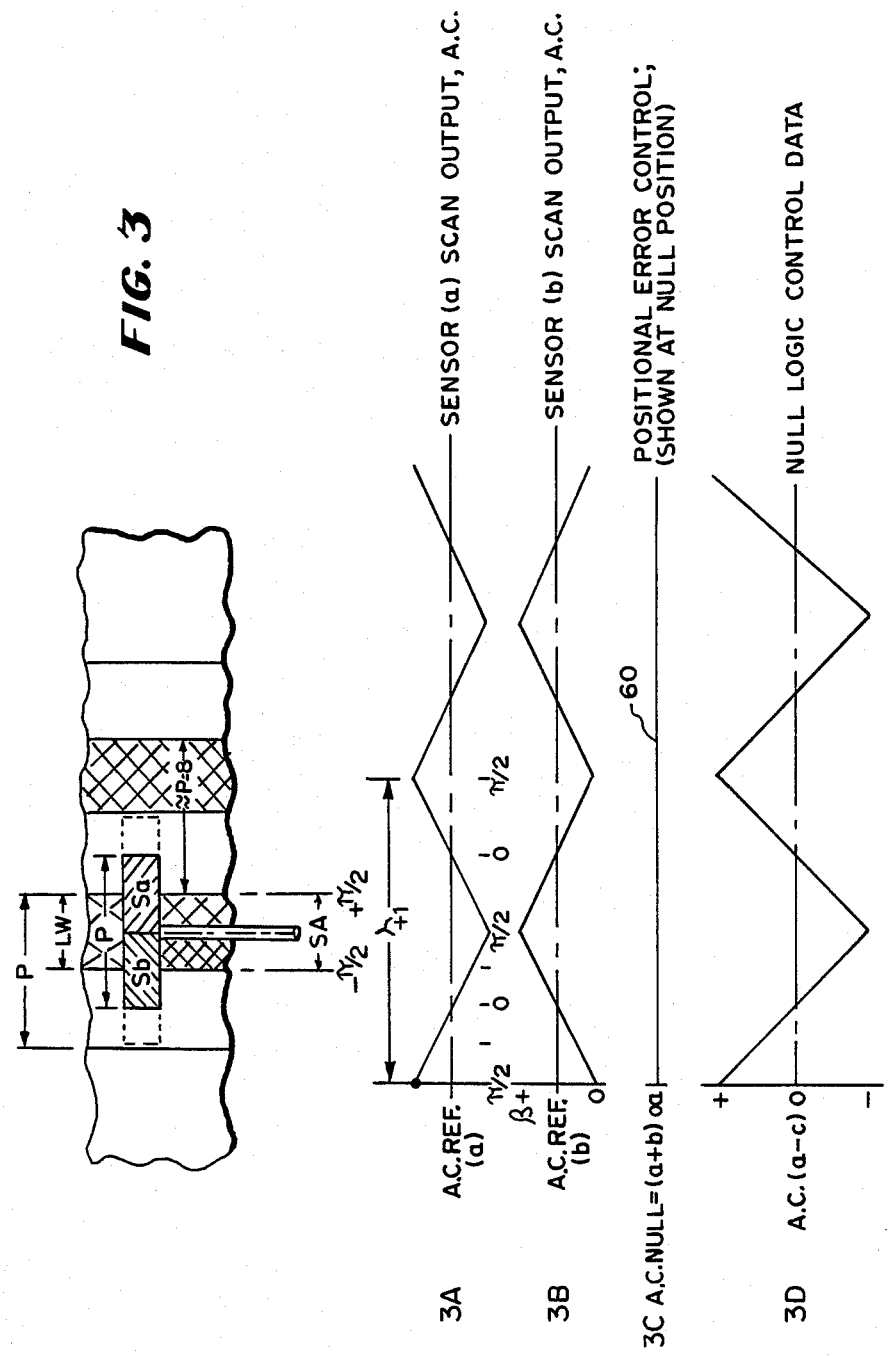

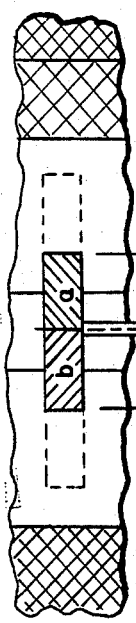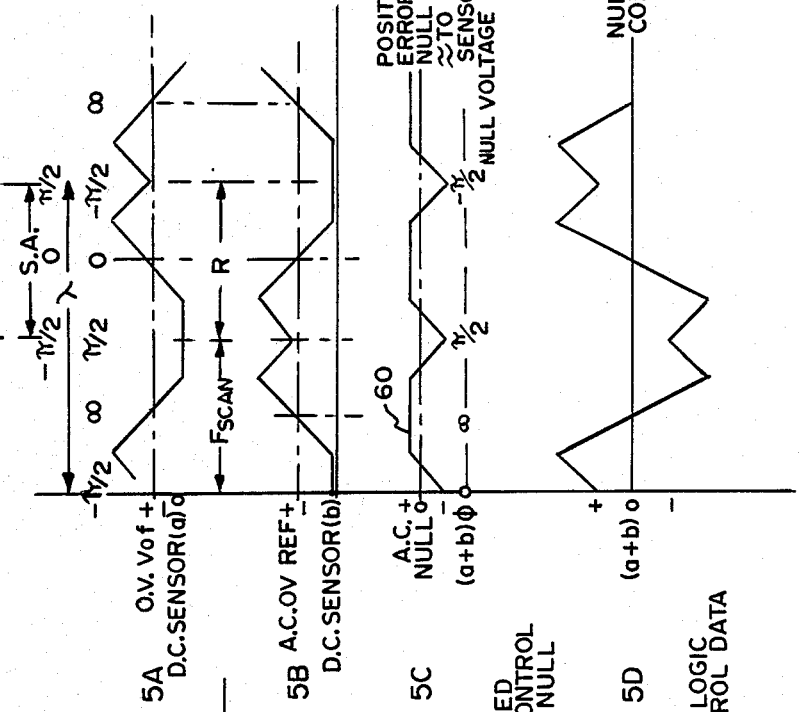
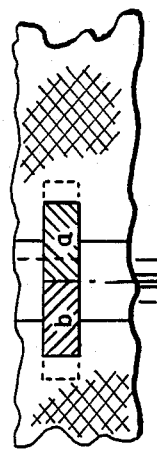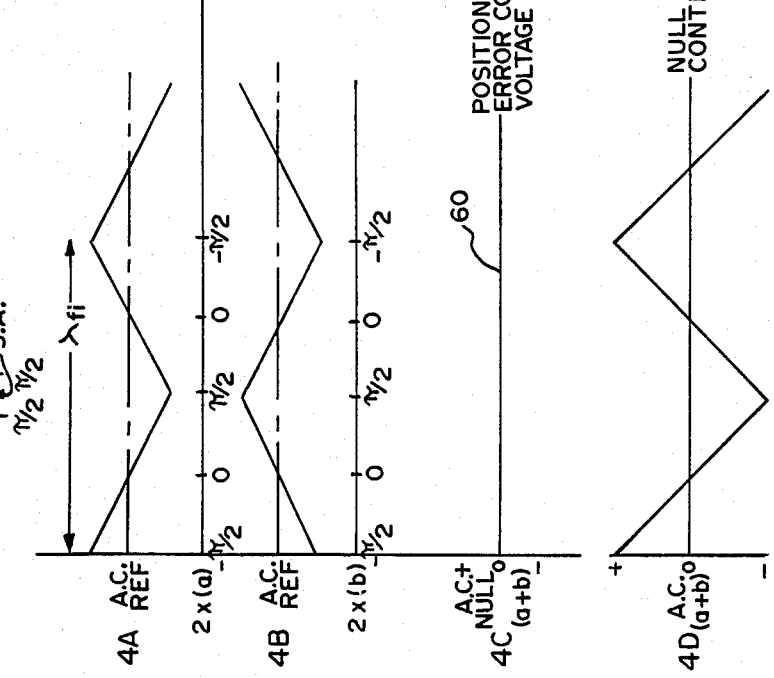
FIG. 5
FIG. 4

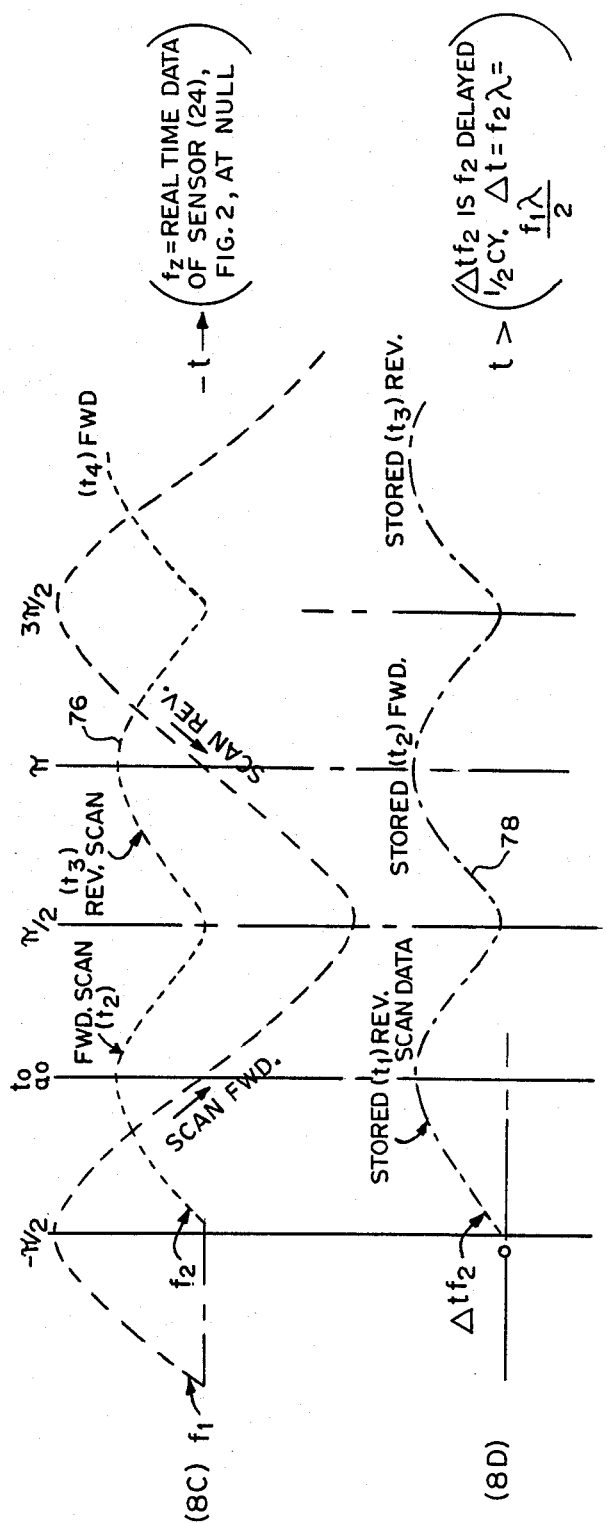

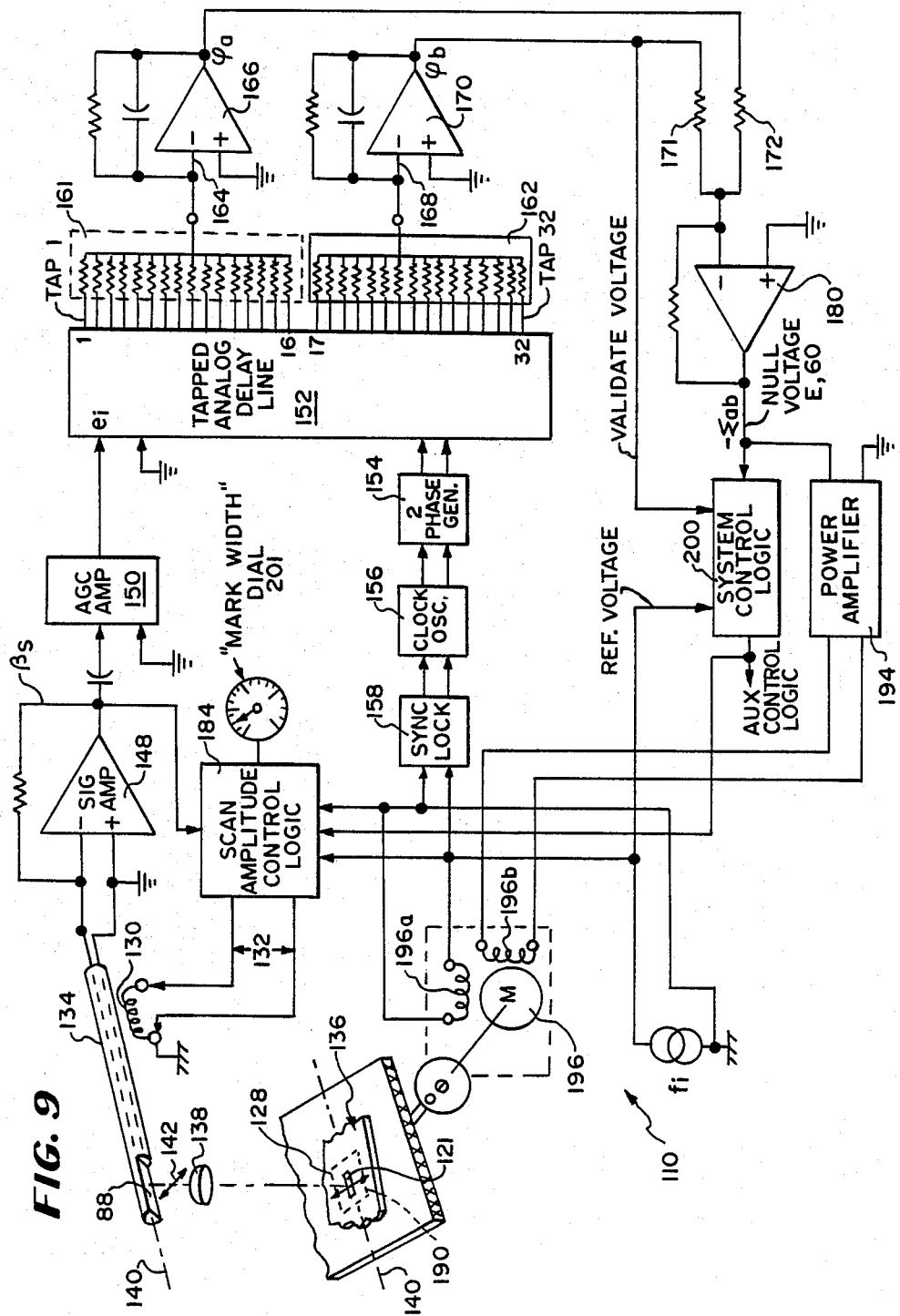

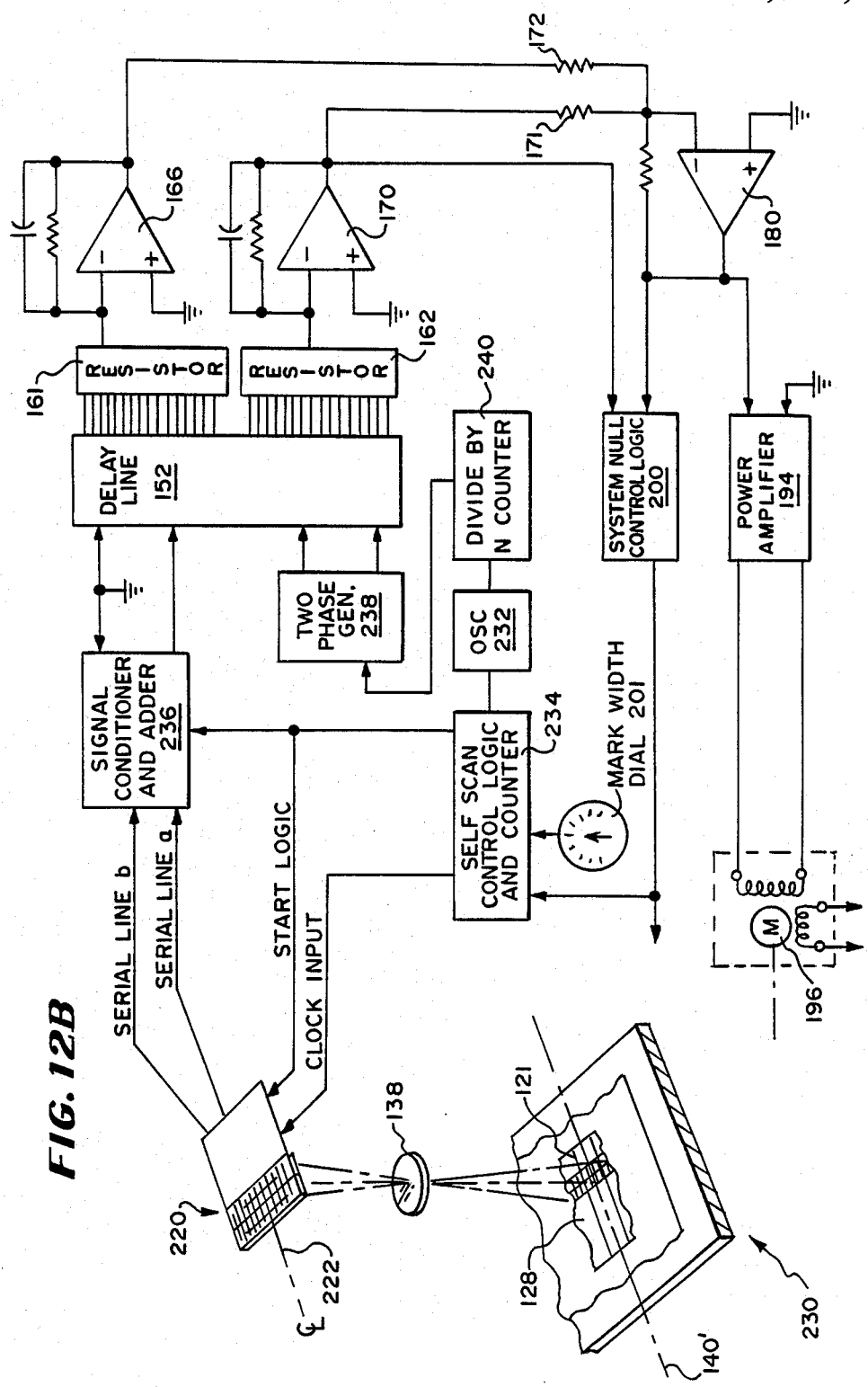

PSEUDO SENSOR PITCH MATCH CYCLIC SCANNING SYSTEM

BACKGROUND OF THE INVENTION

1. Field of the Invention

The present invention relates to an apparatus for the automatic sensing and positioning of a registration mark, indicia, or line target having finite contrast, either optically, magnetically, acoustically or electromagnetically relative to adjacent background utilizing a pseudo match of sensor width to registration mark width.

2. Description of the Prior Art

Mark sensing and scanning apparatus are disclosed in U.S. Pat. No. 3,335,281 to S. P. Willits. Such apparatus utilized a single sensor, having a particular physical width and length, in a cyclic scanning system. FIGS. 1, 4 and 5 in the prior patent show the waveform as generated by the photosensor scanning a given mark. The disclosure in this patent provides an insight into the capabilities of a system utilizing a sensing apparatus which automatically determines and adjusts the scan amplitude relative to the position error of the registration mark. Among these capabilities are a system for obtaining automatic scan amplitude change; higher positional accuracy due to higher loop gain with reduced scan amplitude of the scanning sensor; and demodulation of the sensor's output after amplification in a symmetrical, amplitude saturated amplifier.

While the apparatus suggested by this prior art patent solved many of the apparent problems present at that time, associated with "mark" positioning, and in most instances, provided excellent results for a wide variety of target width and target contrast ratios, it had definite limitations and restrictions in both loop gain characteristics and positional accuracy required by today's wide varieties of target and by the requirement to position to a very high degree of accuracy.

The concept of a "pitch match" sensor array for counting stacks of material having essentially the same thickness or pitch for each of the tightly packed sheets, is disclosed in: the Mohan & Willits U.S. Pat. No. Re. 27,869, where the concept of "pitch match" is described; the Mohan et al. U.S. Pat. No. 4,373,135, where the concept of a pseudo pitch match sensor array is described; and the Mohan et al. U.S. Pat. No. 3,663,803 where an apparatus for specific mark code decoding of a coded panel having relative linear velocity to a pitch matched sensor array is described.

The target sensor characteristics common to all of these pitch match devices are the cyclical repetitive nature of the data base presented to the sensing array and the signal enhancement gained by the technique of achieving the equivalent of spatial filtering by adapting either a single sensor into a pseudo pitch match sensor array or by physically matching a multiple sensor scanning array into a desired spatial pitch match array.

The positioning apparatus and method of the present invention are utilized in a device which automatically senses an indicia on a workpiece and positions the workpiece to bring the indicia into registration by diminishing registration error to near zero. More particularly, the device and method are adapted to sense preferably elongate indicia of varying widths utilizing a positioning apparatus with one or more sensing heads which automatically adapts its sensing modes utilizing comparisons of delayed time data with real time data to a variety of indicia widths and degrees of registration error to rapidly bring the indicia into accurate registration.

As explained above, automatic positioning devices for workpieces have been in existence almost since the beginning of the manufacture of controls. Their goal is to rapidly and accurately position a workpiece for some further operation. Typically, the workpiece to be positioned will bear one or more indicia which will allow the positioning device to accurately sense the indicia and then accurately position the workpiece or bring the workpiece into registration. Typically, the speed of positioning must be traded off against the accuracy of the final registration position for fixed control parameters and fixed inertia associated with the workpiece and movable elements of the positioning device.

The apparatus of the present invention senses an indicia and then moves the workpiece to bring the indicia into registration. The assignee of this application, Spartanics Ltd. of Rolling Meadows, Ill., owns a number of U.S. Patents disclosing apparatus for sensing an indicia or positioning a workpiece bearing an indicia or, in a somewhat unrelated field for sensing and counting sheets in a stack. Among these patents are the following, the disclosure of each of which is hereby incorporated by reference:

| U.S. Pat. No. | Patentee |
|---|---|
| 3,335,281 | Willits |
| Re. 27,869 | Willits et al. |
| 3,790,759 | Mohan et al. |
| 3,813,523 | Mohan et al. |
| 4,373,135 | Mohan et al. |
| 4,542,470 | Mohan et al. |

The significant teachings of these prior patents to the apparatus and method of the present invention are set forth below:

U.S. Pat. No. 3,335,281 to Willits is for a SYMMETRICALLY SATURATED POSITION SERVO CONTROL WITH DUAL AMPLITUDE OPTICAL OFFSET SCANNING. The control of this patent employs a single scanning head to sense each indicia. Further, by employing amplifiers in a saturated mode which does not affect the harmonic content and phase relationship of the sensing signal, the harmonic content and phase relationship being position dependent, exceptional stability over wide variances in loop gain is achieved. Until an indicia is sensed and moved near registration, the scan amplitude of the scanning head is large. Thereafter, the scan amplitude is reduced to provide for more accurate registration. While this control solved many problems in this field twenty-odd years ago, it is relatively intolerant of wide variations in indicia characteristics and is somewhat inaccurate in positioning by today's standards.

U.S. Pat. No. Re. 27,869 to Willits and the present inventor, William Mohan, is for a PITCH MATCHING DETECTING AND COUNTING SYSTEM utilized in counting sheets in a stack. While counting is a far different activity from positioning, this system does employ a sensing head which must distinguish between each of several objects to be counted by distinguishing each object from a near negligible interstitial boundary between the object and adjacent objects. Here the concept of matching a pair of sensors to the width of the object to be counted (pitch matching) was employed to spatially filter unwanted harmonics with their significant contribution to error. When a pair of PM sensors are employed, the phase shift between their respective signal combinations may be employed as an error signal, indicating the degree to which pitch match is achieved. A single sensor oscillating between two limits of oscillation may, if suitably manipulated, provide signals equivalent to that provided by a sensor pair.

U.S. Pat. No. 4,373,135 to Mohan, Willits and Kleemann is for a PITCH MATCH DETECTING AND COUNTING SYSTEM that is an improvement to the system disclosed in U.S. Pat. No. Re. 27,869. This patent discloses the employment of a tapped delay line to synthesized from a single sensor, the equivalent of one or more sensors whose signal outputs are the equivalent of those generated by a sensor array, pitch matched spatially or optically. A sensor signal generated in counting a stack of similar objects or elements is cyclic as the sensed area passes over a plurality of objects which are substantially identical. When a pair of sensors, or sensor arrays, are employed, the signals produced in each by a given, particular element is substantially identical to the other but displaced in time, or phase shifted, as a result of the spatial displacement of the sensors one from the other.

According to the teachings of the present invention, once a single sensor signal is generated (given known parameters) it may be electrically stored and employed to automatically produce a pseudo sensor whose signal is pitch matched to the equivalent of a pitch match system, although the real sensor effective width may be very narrow in comparison with the counted object width or pitch.

SUMMARY OF THE INVENTION

According to the invention there is provided a method for quickly and accurately positioning a workpiece, which is situated on a movable platform and which has at least one indicia mark thereon having a different sensitivity to a sensing means than an adjacent contrast area, to a position where the indicia mark is in registry with a registration axis, said method comprising the steps of:

effecting a scan of a sensing means transverse to the registration axis in the area on said workpiece through which said registration axis extends with sensing means that are capable of generating electrical signals related to what is sensed;

providing in said sensing means a sensor system;

processing the electrical signals generated by said sensor system in a manner whereby some of the signals are treated as the scan data of a first sensor and the other of the signals are treated as the scan data of a second sensor;

setting the effective width of the sensor system at rest to a value which is no greater than slightly greater than the width of said indicia mark;

setting the amplitude of the scan which is effected transversely of the indicia mark when the indicia mark is close to the registration axis to be equal substantially to one sensor width about a center axis of said sensing means;

setting the center axis of said sensing means in registration with said registration axis;

setting the PITCH, namely the area to be scanned by the sensor system to MATCH substantially the scan amplitude plus the effective width of one sensor;

combining the scan signals designated as being the signals of a first sensor with the scan signals designated as being the signals of a second sensor to generate an error correction signal;

supplying said error correction signal to means for controlling movement of said platform to move said platform an incremental amount; and repeating the above steps until the error correction signal is at a null indicating registration of the indicia mark with said registration axis.

Further according to the invention there is provided an apparatus for quickly and accurately positioning a workpiece, which is situated on a movable platform and which has at least one indicia mark thereon having a different sensitivity to a sensing means than an adjacent contrast area, to a position where the indicia mark is in registry with a registration axis, said apparatus comprising:

sensing means;

means for effecting a scan of said sensing means transverse to the registration axis in the area on said workpiece through which said registration axis extends, said sensing means being capable of generating electrical signals related to what is sensed and including a sensor system;

means for processing the electrical signals generated by said sensor system in a manner whereby some of the signals are treated as the scan data of a first sensor and the other of the signals are treated as the scan data of a second sensor;

means a value which is for setting the effective width of the sensor system to a value which is no greater than slightly greater than the width of said indicia mark;

means for setting the amplitude of the scan which is effected transversely of the indicia mark when the indicia mark is close to the registration axis to be substantially equal to one sensor width and about a center axis of said sensing means;

the center axis of said sensing means being in registration with said registration axis;

means for setting the effective area to be scanned by a single sensor the PITCH, to MATCH substantially the scan amplitude plus one sensor width;

means for combining the scan signals designated as being the signals of the first sensor with the scan signals designated as being the signals of the second sensor to generate an error correction signal; and means for supplying said error correction signal to means for controlling movement of said platform to move said platform an incremental amount.

BRIEF DESCRIPTION OF THE DRAWINGS

FIGS. 3, 3A, 3B, 3C and 3D is a plan view of a sensor assembly comprising the sensors Sa and Sb and of the waveforms generated by moving sensors Sa and Sb over a mark where the sensors Sa and Sb (S') have a width of 4 units the mark line width LW=4, the scan peak-to-peak amplitude SA is 4 and there is a "pitch match" of (Sa+Sb)=(SA+S')=8.

FIGS. 4, 4A, 4B, 4C and 4D is a plan view of the sensor assembly comprising the two sensors Sa and Sb and of waveforms generated by the spatial (array)

movement of the sensors Sa and Sb over the mark where there is no "pitch match" and where the pitch P=6 units each sensor has a width of 4 units and LW=4 units and SA=2 units.

FIGS. 5, 5A, 5B, 5C and 5D is a plan view of the sensor assembly comprising the two sensors Sa and Sb and of waveforms generated by movement of the sensors Sa and Sb over the mark where there is no "pitch match" and where the pitch P=12 units, each sensor has a width of 4 units and LW=4 units and SA=8 units.

Figure 6:
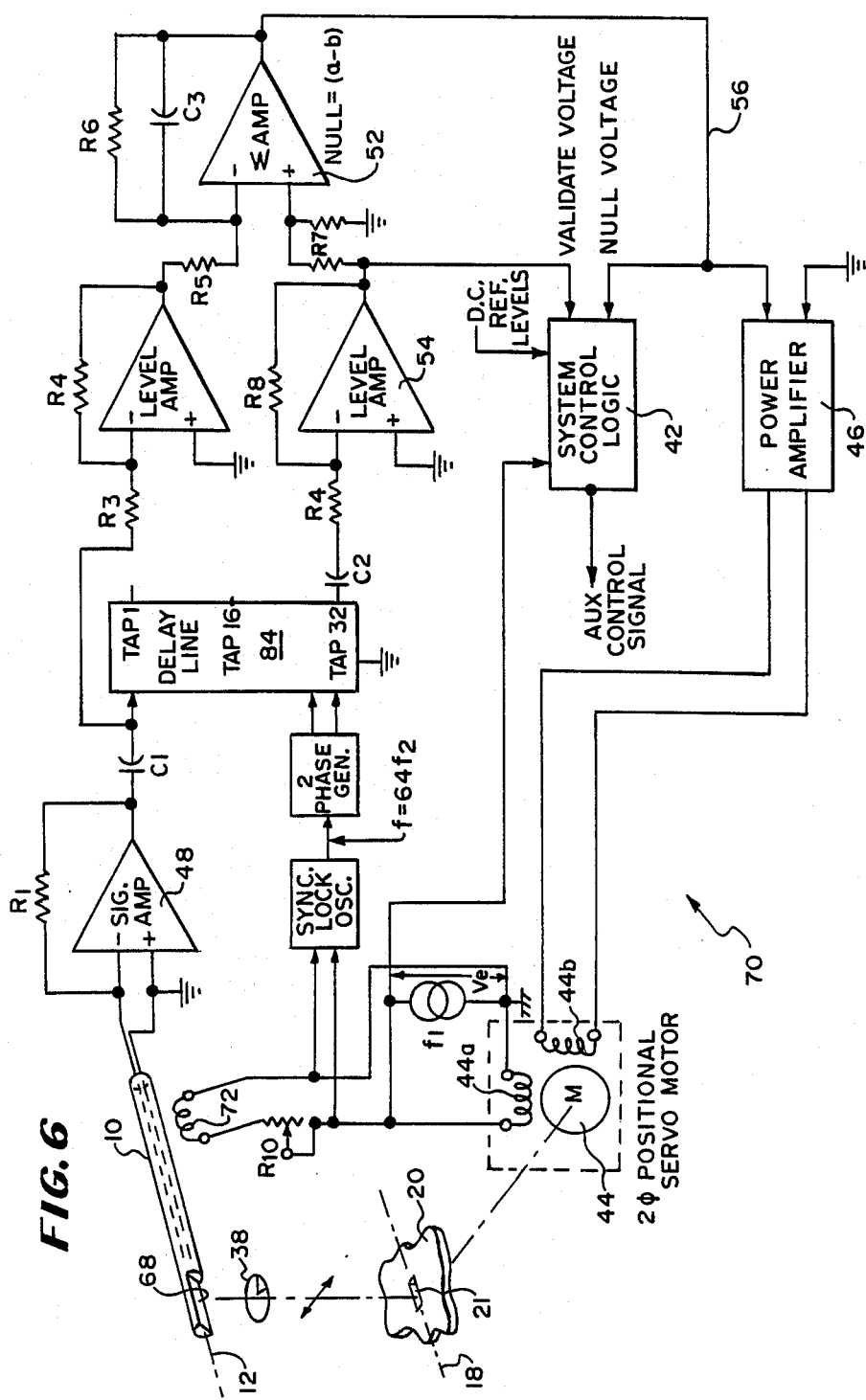

FIG. 6 is a schematic circuit diagram, partly electrical and partly mechanical, of another scanning system constructed according to the teachings of the present invention wherein one sensor having a width matched to the width of the mark is used.

Figure 7:
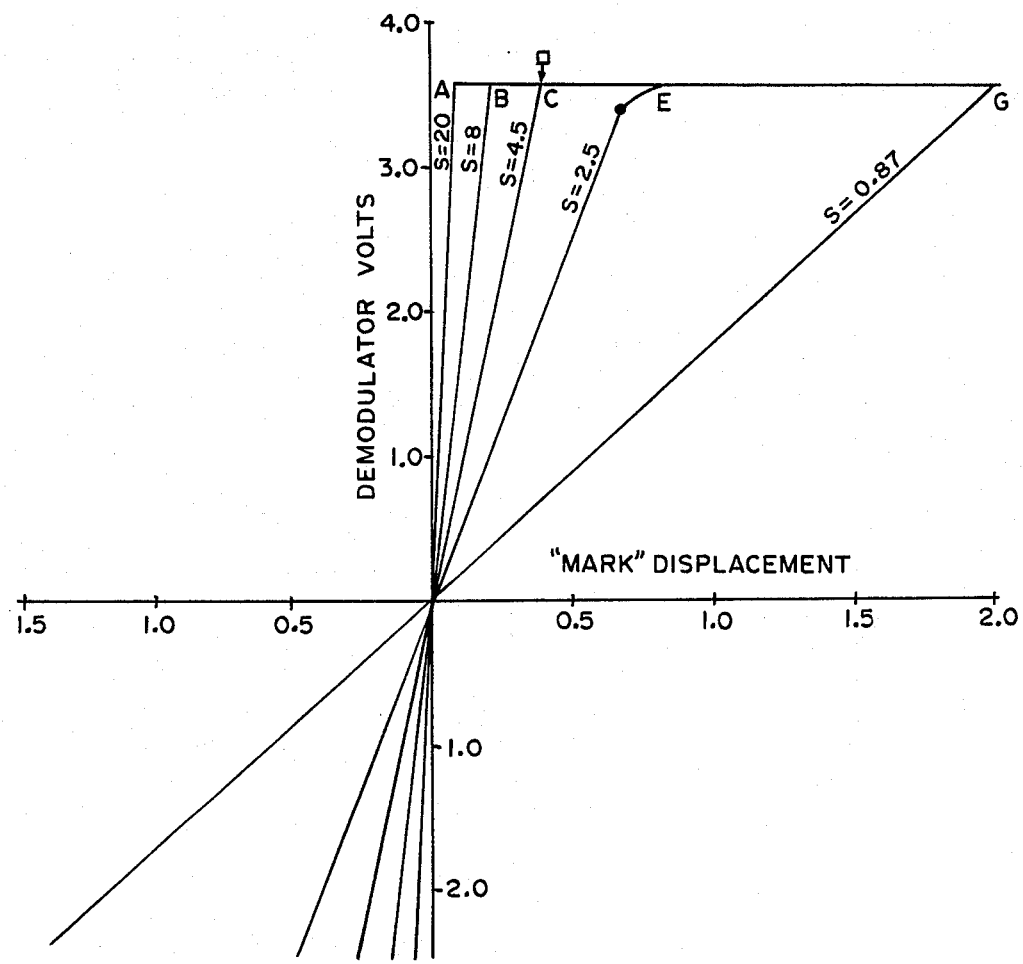

FIG. 7 illustrates five graphs A, B, C, E and G of the system positional error gain dependency characteristic as a function of five different scan amplitudes for a particular line width and sensor width utilizing delayed data comparison and plotting demodulated voltage vs "Mark" displacement for the five different scan amplitudes.

Figure 8A:
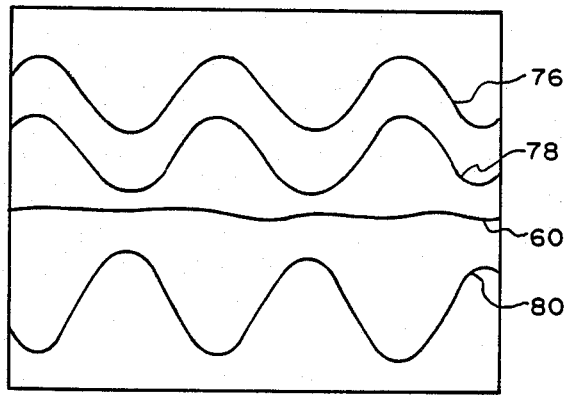

FIG. 8A is a set of waveforms comparing the waveform of scan real time null voltage with a 360° delayed image thereof.

Figure 8B:
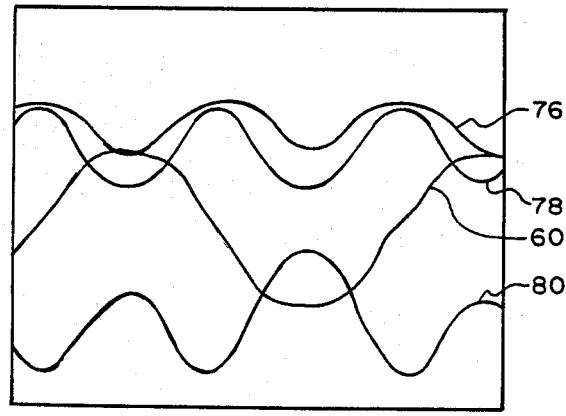

FIG. 8B is a similar set of waveforms but showing a waveform for an error voltage for a mark displaced from a null by 0.001 inch.

FIGS. 8C and 8D are waveforms generated by forward and reverse spatial scans with FIG. 8C showing a waveform of real time scan data at null and with FIG. 8D showing a stored waveform at real time of past scan data at null.

FIG. 9 is a schematic circuit diagram, partly electrical and partly mechanical, of a further cyclic scanning system constructed according to the teachings of the present invention including a single very narrow width sensor for achieving a pitch match pseudo scanning system capable of optimizing the positional gain characteristic for all "Mark" indicia target widths.

Figure 10C:
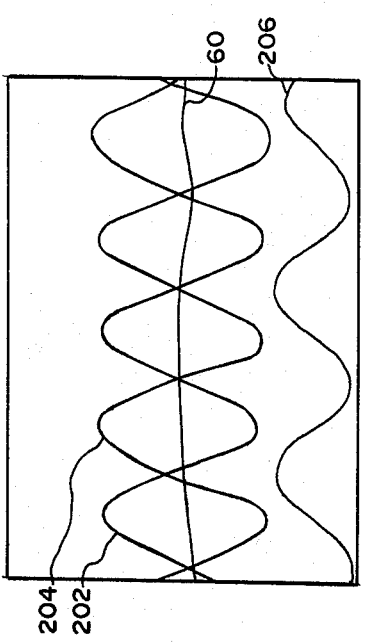
Figure 10D:
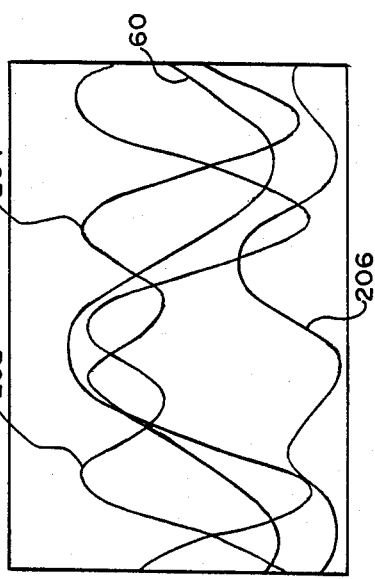
Figure 10A:
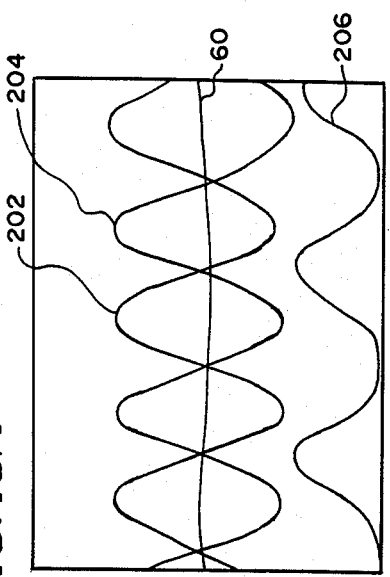

FIG. 10A is a set of waveforms of the real time voltage and the delayed voltage (180° out of phase) at the null condition (registration) for a "pitch match" of 0.020 inch.

Figure 10B:
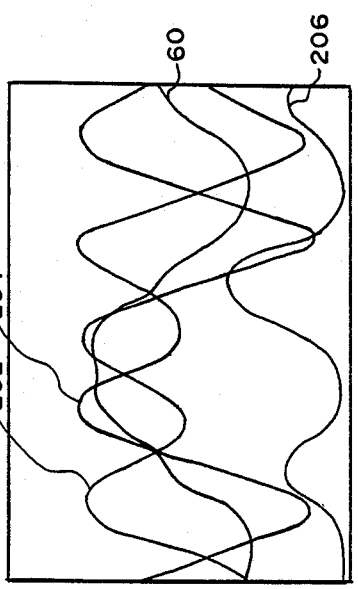

FIG. 10B is a set of waveforms of the real time voltage and the delayed voltage (180° out of phase) for a deviation from null of 0.0012 inch for a "pitch match" of 0.020 inch.

FIG. 10C is a set of waveforms of the real time voltage and the delayed voltage (180° out of phase) at the null condition (registration) for a "pitch match" of 0.010 inch.

FIG. 10D is a set of waveforms of the real time voltage and the delayed voltage (180° out of phase) for a deviation from null of 0.001 inch for a "pitch match" of 0.010 inch.

Figure 11:
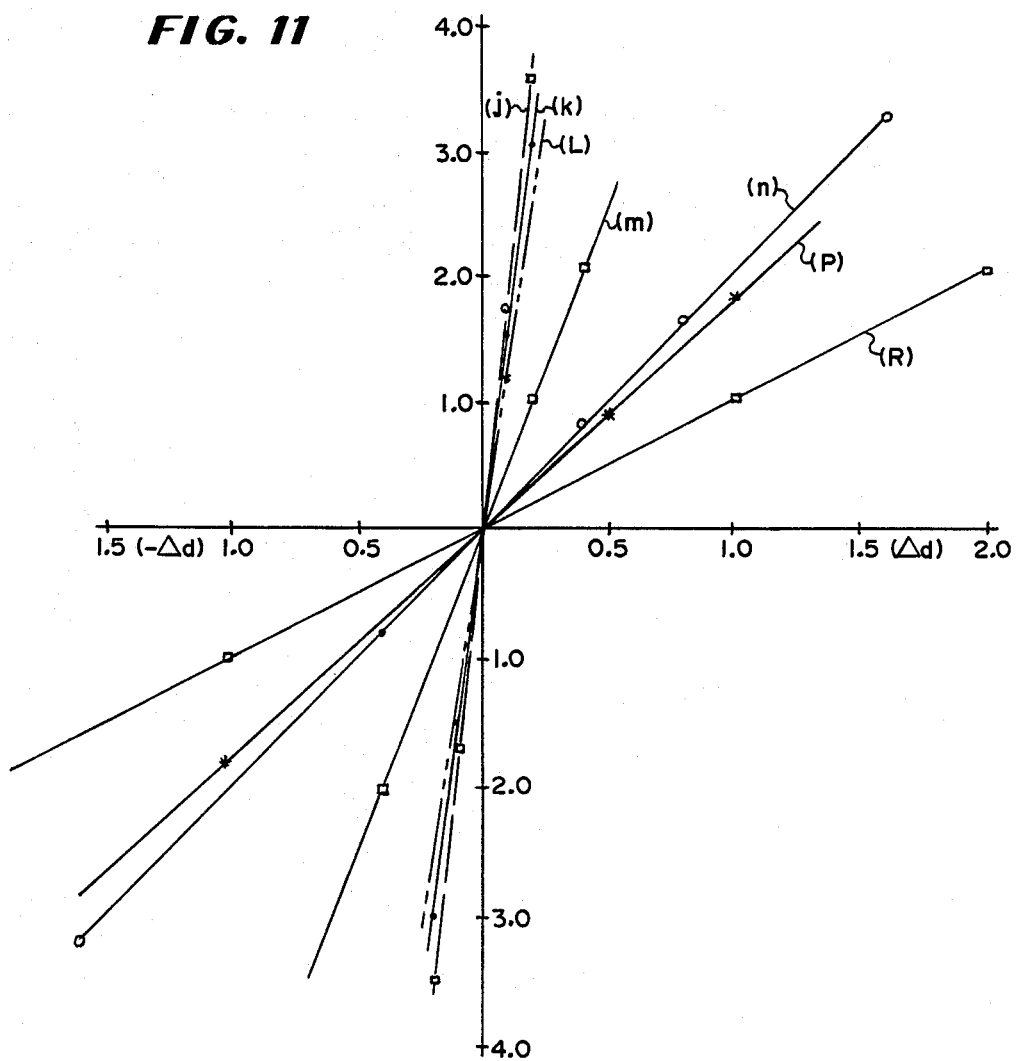

FIG. 11 illustrates seven graphs (j)–(m), (p) and (r) of the gain transfer characteristic for different pitch match and scan target mark with combinations plotting demodulating voltage versus "mark" displacement.

Figure 12A:
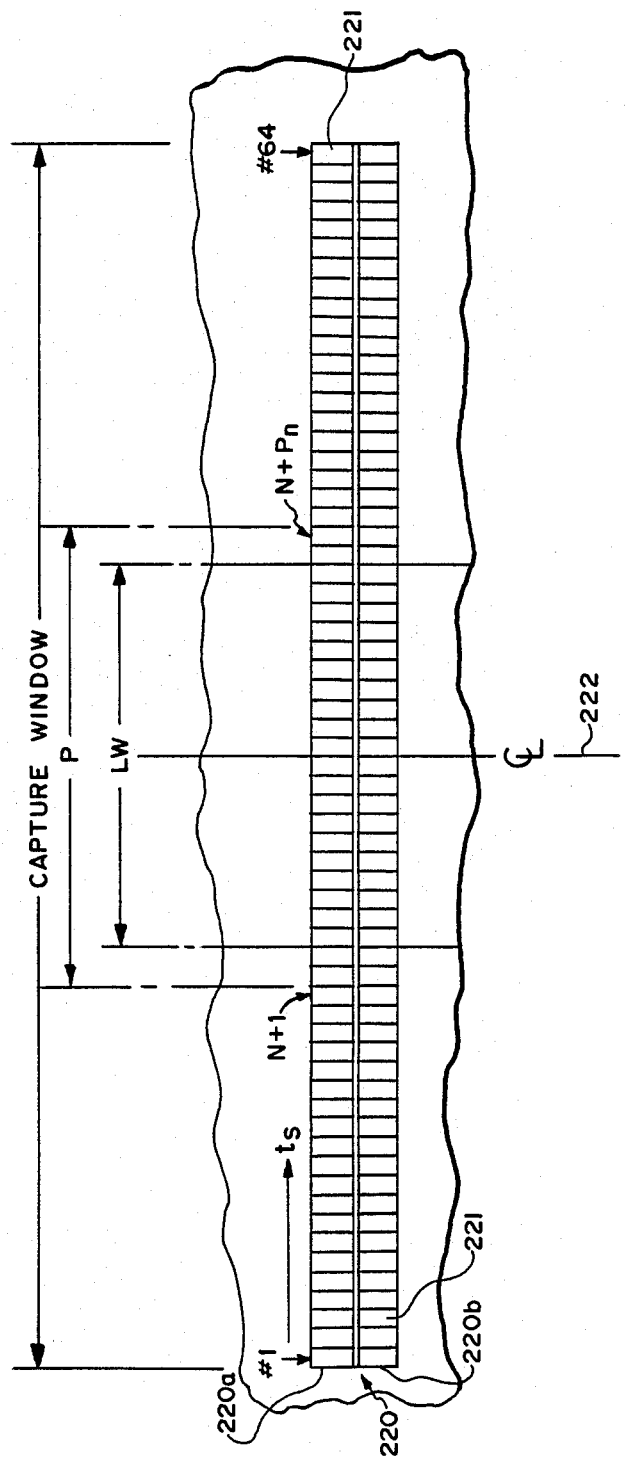

FIG. 12A is an enlarged plan view of a stationary sensor array used in still another embodiment of the scanning system of the present invention.

FIG. 12B is a schematic circuit diagram, partly electrical and partly mechanical, of still another scanning system constructed according to the teachings of the present invention wherein a stationary sensor array as shown in FIG. 12 is employed.

DESCRIPTION OF THE PREFERRED EMBODIMENT

Figure 1:
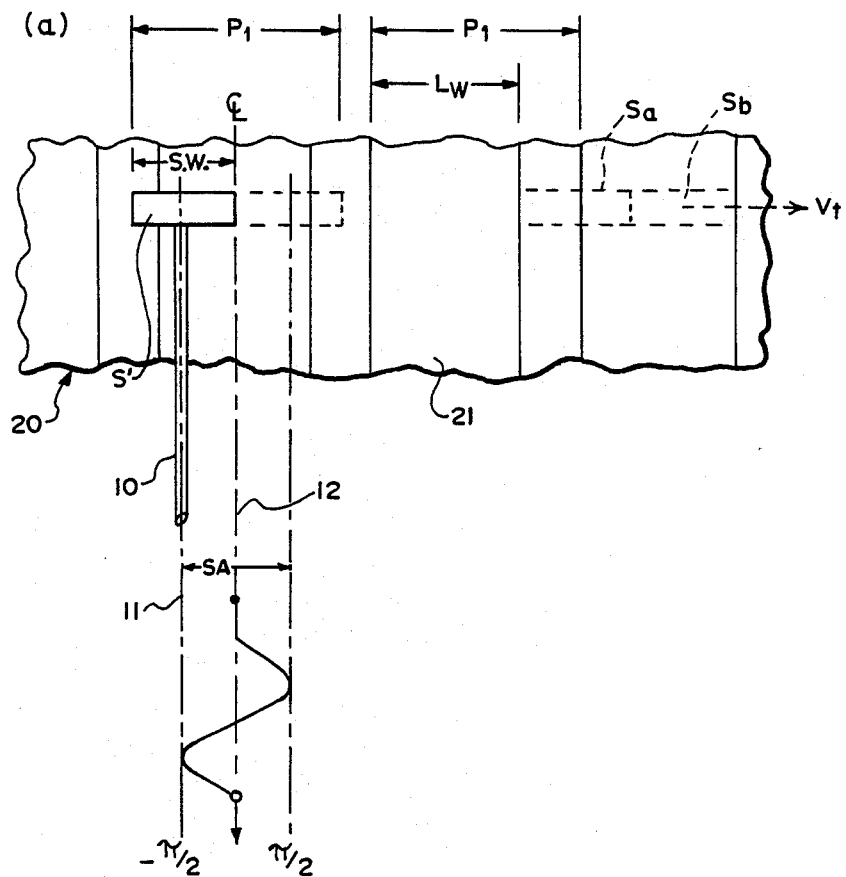
FIG. 1 is an enlarged plan view of a registration mark and a sensor assembly used in one embodiment of the scanning system of the present invention.
Figure 2:
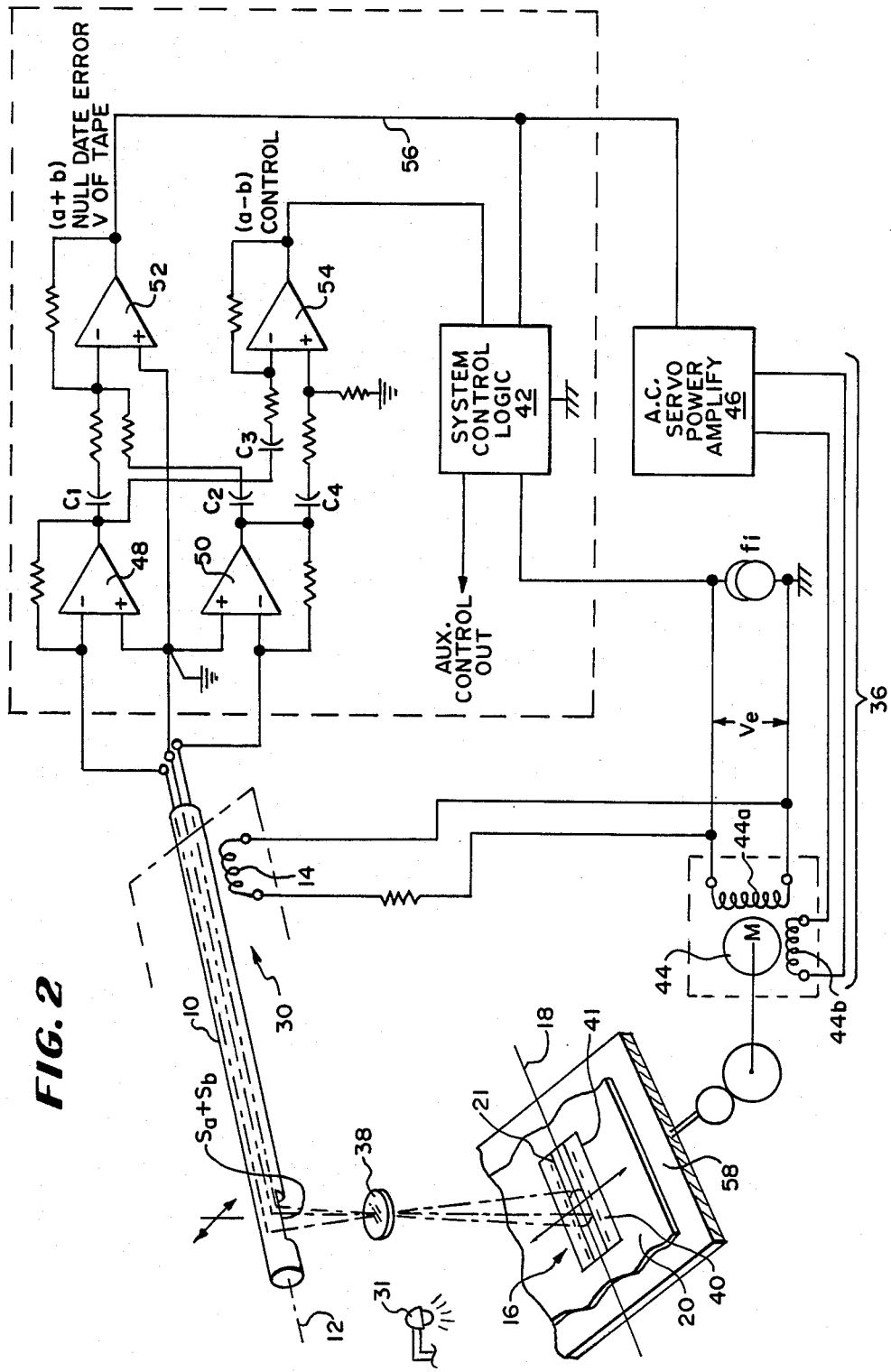
FIG. 2 is a schematic circuit diagram, partly electrical and partly mechanical, of one scanning system constructed according to the teachings of the present invention wherein two sensors Sa and Sb are used as shown in FIG. 1.

Referring now to the drawings in greater detail, there is illustrated in FIG. 1 an enlarged view of a scanning wand 10 having a single sensor Sa or Sb, here defined as S', mounted at the distal end thereof. This scanning wand 10 is caused to reciprocate a predetermined distance, transversely of the elongate axis 11 of the wand about a scan axis 12 (FIG. 2) over a target area 16 (FIG. 2). The target area 16 includes a registration axis 18 which is directly beneath the scan axis 12 and the objective is to position a workpiece 20 having a registration mark 21 on the registration axis 18 quickly and accurately so that an operation such as a cutting or stamping operation can be performed on the workpiece 20. The length, width or distance of reciprocation of the wand 10 is referred to as the scan amplitude SA. The width of the mark 21 is defined as LW.

It is to be understood that the reciprocation of the wand 10 is achieved by "waving" the wand about its proximal end with the motor 14 such that the sensor S' at the distal end of the wand actually moves through a slight arc which has a large radius relative to the distance of reciprocation or scan amplitude SA that for the purpose of the scanning systems of the present invention one can assume that the wand 10 is reciprocated side-to-side as illustrated in FIG. 1.

According to the teachings of the present invention to obtain quick and accurate registration of the mark 21 with the registration axis 18 and the scan axis 12, the scan peak-to-peak amplitude SA is so adjusted as to also match the effective width of a single sensor Sa or Sb, defined herein as S'.

"Pitch match" as used herein is defined as having a scanning sensor (pair Sa and Sb) effective width at rest (not scanning) equal to the effective width utilized by the single sensor (Sa or Sb) in its scanning mode.

Thus the pitch match condition is where Pitch, P, is the effective area scanned by a single sensor Sa or Sb; scan peak-to-peak amplitude is SA; and S' is either Sa or Sb:

$$Sa = Sb = SA = P/2 = S' \qquad 1.$$

$$Sa + Sb = P \qquad 2.$$

$$SA + S' = P \qquad 3.$$

With these conditions of scan, each sensor Sa and Sb will generate an identical train of waveform data for the mark 21 centered on the scan axis 12. The waveform data generated for sensor (Sa and Sb) scan for various scan relationship conditions are shown in FIGS. 3–5.

In FIG. 2 one scanning system 30 constructed according to the teachings of the present invention is schematically illustrated. The system 30 includes a source of illumination 31 which is directed to the workpiece and utilizes a pair of matched sensors Sa and Sb which function in a scanning mode to sense reflected light from the workpiece to achieve the desired characteristic of a Pitch-Match scanning system. In particular, the system 30 is designed to have a desired positioning characteristic for a particular set of mark, width, scan amplitude and sensor pair width conditions.

In the embodiment the scanning wand 10 has a matched pair of sensors Sa and Sb mounted thereon and is driven by the motor 14 powered by an excitation voltage Ve to produce a peak-to-peak scan amplitude SA (FIG. 1).

The system 30 further includes signal processing circuitry 34, and drive circuitry 36 for operating the scan motor 14 for causing oscillation of the wand 10. Also, a lens 38 is provided below the sensor pair Sa and Sb to the width of the mark 21 image "pitch" area, P, located in a contrast area 40 on the workpiece 20 in a "mark continue window 41" upon the sensor pair.

System control logic 42 controls operation of the scan motor 14 for oscillating the wand 10 in wide scan and pitch match scan. A two phase servo motor 44 having windings 44a and 44b for positioning the workpiece is controlled by an error-voltage-responsive servo power amplifier 46.

The sensors Sa and Sb generate signal waveforms which are supplied to preamplifiers 48 and 50. The outputs from these preamplifiers 48 and 50 are supplied through coupling capacitor C1 and C2 to a summing amplifier 52. Likewise, the same outputs are supplied through coupling capacitors C1 and C2 to a subtracting amplifier 54. The waveform generated by sensor Sa is 180° from the waveform generated by sensor Sb and the two waveforms are summed in summing amplifier 52 after decoupling the d.c. with capacitors C1 and C2 from the preamplifiers 48 and 50 to obtain a null or error voltage.

The summation of the waveform generated by sensors Sa and Sb in the subtracting amplifier 54 results in a contrast signal whose magnitude is used to define a true null, i.e. when the output of amplifier 52 is a null—the output of amplifier 54 will state that the null is due to a positioned null not a zero target input. Any positional departure of the "mark" 21 from the true center of scan (axis 12 and 18) will generate a pair of displacement data signals in the preamplifiers 48 and 50, which will produce an error voltage in the summation amplifier 52 having a frequency of (f1), the scan frequency, and a phase relationship that is 180° apart for the mark displacement movement either "in" or "out" beyond the registration on center axis 18.

The error voltage on line 56 is further amplified in the A.C. power amplifier 44 and used to reposition a platform 58 which is driven by the servo (2 phase) motor 44 to reposition the mark 21 situated on the workpiece 20 to maintain the mark 21 at an exact centered position to the scan axis 12.

FIG. 3 shows a Pitch-Matched (PM) Scanning Condition, the width of Sa, Sb, and S' each equal 4 units, (Scan Amplitude, i.e. (P.P.)=SA equals 4 units, LW equals 4 units, and P=SA+S'=8; Sa+Sb=8; or (Sa+Sb)=(SA+S'S)=PM. Waveforms 3a and 3b, are generated at null wherein data generated from sensor Sa is 180° out of phase with data generated from sensor Sb.

Adding these two waveforms in amplifier 52 (FIG. 2) after decoupling the D.C. with capacitors C1 and C2 from preamplifiers 48 and 50, will produce a null positioned "mark" error voltage 60 shown as waveform 3C (FIG. 3).

FIGS. 4 and 5 show the waveforms which are generated from sensors Sa and Sb when amplitude SA is less than the width S'=Sa=Sb=LW (FIG. 4) or greater, than the width of S=Sa=Sb=Sb=LW (FIG. 5).

A unique feature of the present invention is the utilization of a method for setting the PITCH, which is defined as the effective area to be scanned by the sensor system, to MATCH substantially the scan amplitude plus the effective width of one sensor in order to quickly and effectively bring a mark into registry with a registration axis.

In another embodiment of the scanning system of the present invention a single sensor 68 is utilized in a unique manner in a cyclical scanning technique to provide a scanning system 70 (FIG. 6) which has some of the advantages of a "pitch match" cyclical scanning system. The system 70 is shown in FIG. 6 and includes a scan motor 72 and the two phase servo motor 44. The system 70 provides a positional, servo control voltage that is derived from the utilization of the single scanning sensor 68 whose real time output signal waveform 76 (FIGS. 8A and 8C) is differentially compared to a specific time delayed, stored image signal waveform 78 (FIGS. 8A and 8B) of its past opposite direction scan. Waveform 60 is the error voltage and waveform 80 is the logic control voltage which is a summation of waveforms 76, (a), and 78, (b). Here, the combining of the waveforms 76, (a), and 78, (b) is a subtracting of one from the other as opposed to the adding of the waveforms shown in FIGS. 3A and 3B in summing amplifier 52. In this embodiment, the width S' is equal to LW.

Since many of the components of the system 70 are identical to components of the system 30 like reference numerals are utilized to identify identical components.

In FIG. 6 the scanning sensor is positioned and centered relative to the mark 21, i.e., exactly on scan axis to the mark 21 and the sensor 68 is oscillating through the mark 21, first forward then backward as caused by the cyclical scan excitation voltage having a frequency f1. For this example, f1 is sixty cycles per second. This scan excitation voltage will generate a cyclic data rate of forward and reverse scans of f2 equal to 2f1 in scan sensor 68.

If one then provides a storage time delay T between the present scan data (output voltage 76 at frequency) f2 and the stored past scan data (output voltage 78) equal to the time of one cycle of f2, the data cyclic rate at null would, in essence, be comparing in real time: the forward scan data to the past historical backward scan data, and the real time backward scan data to the past historical forward scan data as shown in FIGS. 8A through 8D, where waveform 76 ($\phi a$) is the real time scan data and waveform 78 ($\phi b$) is the stored past scan data.

If the mark 21 registration axis 18 is perfectly centered on the scan axis 12 and there are no irregularities in the mark 21, the scan, the sensor's 68 uniformity, or the illumination, each direction of scan would look and generate data exactly the image of the others stored past data.

Taking the difference electrically, of these two signal waveform data trains, will produce a zero voltage at null, i.e, the mark 21 position is centered. Any deviation of the mark registration axis 18 from the reference scan axis 12 will produce an A.C. error signal 60 (FIGS, 8A and 8B), whose fundamental signal component will be at the basic scan reference frequency f1 and whose amplitude magnitude and phase polarity will depend on the direction and magnitude of the mark displacement from null reference position. The positional error voltage or null signal 60 will be essentially a harmonic free - zero voltage at null, having an abrupt 180° phase reversal as the mark 21 moves through the center of scan reference position or scan axis 12, thus presenting a uniquely clean, proportional, positioned control voltage for use in a material (workpiece 20) control positioning system 70.

Demodulation of the positional error control voltage 60 will provide the same characteristic for a D.C. control system.

Unlike the prior art, whose positional error voltage changes from a fundamental into a large second harmonic voltage near or at null position of scan, as shown by FIG. 8A by waveform 76 (φa), thereby placing limitations on the control characteristic. System 70, by comparing the scan real time null voltage, waveform 76 (φa) with its 360° delayed image, waveform 78 (φb), and taking the difference thereof, produces a true zero voltage control signal at null position, as shown by the error voltage waveform 60 (equal to 0 at null) shown in FIG. 8A and by the error voltage waveform 60 (greater than 0 for a mark displacement from null of 0.001") in FIG. 8B.

The system 30 shown in FIG. 2 for positional mark sensing lacks the ability to present a constant, positional loop gain for all index mark widths encountered for positioning.

Both system 30 and system 70 also lack the above ability. System 30 and 70 have these attributes only for a single unique relationship of the mark 21 width to the sensor 68 width to scan amplitude, where a pseudo pitch-match can be achieved.

In system 70, if the single sensor 68 width is ½ of the width of the mark sensing area P and the scan amplitude is also ½ of this width P as shown in FIG. 1, and the waveform data generated is combined in a specific manner, a "pseudo" pitch match scanning system is achieved. But again, this is only achieved for a single unique relationship of single sensor width to scan amplitude to mark P area, as disclosed below.

Referring again to the single sensor 68 and the system 70 shown in FIG. 6, if the clocking rate to delay line 84 is changed to a frequency fc of double the rate of that which generated the 360° delay of waveform data from the single sensor 68, or keeping the same clock rate but using the waveform data out of a tap (16) rather than tap (32), i.e. half way through the delay line 84 feeding a resistor R4 of the amplifier 54 and then adding this data into the summing amplifier 52 by moving the resistor R7 to the junction of resistors R5 and R6, one, in effect, generates data of a pseudo sensor ½ width of the mark area P provided that the single sensor 68 and the scan are each of the same effective width. In effect, a pair of matched sensors, one real time spatially and one temporal, are generated for feeding the output waveform data into the amplifier 52 to develop a positional control (error correction) output voltage 60.

FIG. 7 shows the system positional error gain dependency characteristic as a function of scan amplitude, for a particular line width and sensor width utilizing the delayed data comparison, as described above for the system shown in FIG. 6.

Inspection of FIG. 6, in light of the prior art, as described in Willits U.S. Pat. No. 3,335,281, and the system 70 described above, reveals the following observations for a particular set of scan parameters. With the single sensor 68 exactly matched in width to the mark target 21, relatively little scan amplitude will be required to develop full servo error control voltage for a minute displacement of the mark from the center of scan axis 27. This gain dependency on scan amplitude characteristic is shown in the graphs A, B, C, E and G shown in FIG. 7 where the "S" number is the curve slope ratio, and applies to the pseudo sensor system 70. For this system of mark positioning, the system positional servo loop gain is controlled by the change of phase of the sensor's output scan signal with a given change in mark displacement. Thus, the servo loop gain increases rapidly as the amplitude of scan is reduced. This is a highly undesirable condition of operation for a system which should be universally capable of operating on any width positioning mark. Thus the requirement of a Pitch-Match Cyclic Scanning System.

The graphs A, B, C, E and G in FIG. 7 are for a line width of 0.020 inch, a sensor width of 0.020 inch, and a time delay of T~360° of a 60 Hz scan motor excitation voltage for differing scan amplitudes set forth below:

| Graph | Scan Amplitude | LW:SA | Pitch Match |
|-------|---------------|-------|-------------|
| A | 0.005 | 4:1 | No |
| B | 0.010 | 2:1 | No |
| C | 0.020 | 1:1 | Yes |
| E | 0.040 | 2:1 | No |
| G | 0.080 | 4:1 | No |

The definition of "pitch-match" has been described in the various prior patents referred to above. It is a generic term applied to mean matching the effective width of a sensor or sensor array to the pitch of the particular target area in question. In counting, "pitch" has been defined to mean the width of a single element in a stack of sheet material being scanned. In reality it is the width of a single element, or sheet of material along with is minute interstitial contrasting space between the adjacent single sheet comprising the stack.

For the system 70 of the present invention, where a scan through a mark is carried out in a contrasting background for determining its position, the "pitch" is defined as the width of the area utilized by the single scanning sensor 68 as it traverses from one side of the contrasting background 40 through the mark to the other side of the background 40 in a single direction of scan, to generate a cycle or waveform of sensor data. FIG. 1 graphically shows this for both a cyclic scanning system, single sensor 68 (scanning wand 10) whose width is ½ of the pitch P and the linear scan system, as used in counting, and for a sensor pair of sensors Sa and Sb each one matched to ½ of the pitch P with a linear velocity Vt.

One preferred method of adapting a single, very narrow width, sensor 88 in a cyclic scanning system to achieve a "pitch-match" pseudo scanning system 110, capable of optimizing the positional gain characteristic for all mark indicia targets widths is shown in FIG. 9. The system 110 is one preferred system.

In operation of the system 110, a single, very narrow width sensor 88, as compared to a "mark" 121 indicia width situated in contrasting background 128 is cyclically scanned by a motor 130, excited by a controllable amplitude A.C. reference voltage 132. The scan motor 130 causes a sinusoidal velocity of scan by sensor 88 situated in wand 134 of the mark field 136 containing indicia mark 121 so imaged upon photosensor 88 by a lens system 138. The mark illumination has not been shown for convenience. It may be top illuminated for opaque material or bottom illuminated for transparent material.

The positional amplitude of scan about the mean scan reference axis 140 is determined by the magnitude of the scan excitation voltage 132. The magnitude of the phase relationship of scan is from $-\pi/2$ to $+\pi/2$ radians of scan excitation drive voltage 132. See FIGS. 1, 3, 4, and 5. The sinusoidal velocity vector 142 of the scan sensor 88 can be considered to be normal to the mark 121 and to have a near uniform linear velocity over the area of scan at or near the null reference position axis 140. The initial output of sensor 88 appearing at the output of signal amplifier 148 will have the same general appearance as in the prior art U.S. Pat. No. 3,335,281 except with added higher harmonic due to the narrow width of the sensor 88 profiling the target brightness characteristics. This signal is then processed through A.G.C. amplifier 150 to maintain its analog integrity and to prevent saturation of tapped analog delay line 152. It will be understood that the clocking rate of data through delay line 152 is established at sampling rate of 16 bits per cycle of data when a scanning voltage excitation 132 of 60 cycles per second f1 is utilized to produce a data rate of 2f1, i.e., data at null f2=2f1. The sampling or clocking rate of this 120 Hz input data will be such as to generate a pair of pseudo sensor waveform data trains, for each direction of scan within the 32 taps of the delay line 152. Therefore each pseudo sensor will consist of the sum of 16 output tap bits, requiring a clocking rate of f2×2×16=3840 cy/sec. This, multiplied by two, for a required two-phase input 154 of the delay line 152 require a clocking rate for an oscillator 156 of 7680 cycles per second. The oscillator clock 156 requires further synchronizing to scan excitation voltage frequency 132 and is locked into an f1 submultiple by a locking amplifier 158. This clocking rate is for this example only.

If we consider the sensor's effective width much smaller than the mark 121 width, the pitch of the scanned area P will be essentially that of the scan amplitude S.A.

With the above clocking criteria, the delay line 152 will automatically produce a pair of sensor signal waveforms, each one half the width of this pitch, by: summing output taps 1 through 16 of delay line 152 via a resistor bank 161, and by: summing output taps 17 through 32 via resistor bank 162. The output of resistor bank 161 is supplied to an input 164 of an operational amplifier 166 and the output of resistor bank 162 is supplied to an input 168 of an operational amplifier 170. The two waveform data trains from these amplifiers, 166 and 170, which are 180° out of phase at null mark position, are added through resistors 171 and 172 to provide a uniquely clean positional error control voltage 60 (FIGS. 10A-10D) out of summing amplifier 180.

For system 110, pitch (P) is defined as having the same effective physical dimensions as the peak-to-peak amplitude of scan, SA, assuming the scan sensor's width SW is very narrow as compared to the scan amplitude SA or the width LW of the mark. As such, the system 110 of FIG. 9 generates a pair of pseudo sensors having the effective width of the peak-to-peak scan amplitude SA. Further, if the system 110 of FIG. 9 is established or operated to first have a wide scan amplitude, i.e, ±0.05″ greater than the mark width and centered about its reference axis 140, then a wide scan area can be utilized as a mark capture window 190 including registration axis 140. The system's servo positioning devices, comprising power amplifier 194 for converting the error voltage from null amplifier 180 then will properly drive a servo motor 196 to effect a "1st null" of the mark 121.

A system control logic unit 200 is provided, which receives an error control signal E,60 and which, in conjunction with the scan amplitude control logic 184 will automatically reduce the scan amplitude SA to the required pitch match width LW, once the mark is captured and positioned to the 1st null. The mark width is set in the system 110 by a dial 201.

The system 110 will then reposition the mark to a "fine-tuned" 2nd null, whose servo gain transfer characteristic will be essentially constant for all mark widths LW so dialed in and so matched to the final scan amplitude SA for final high gain closedloop servo positioning.

FIGS. 10A-10D are graphs of pseudo sensor signal waveforms wherein waveforms 202, $\phi a$, and 204, $\phi b$, are taken from output of amplifiers 166 and 170 respectively and the null error voltage E, (60) out of amplifier 180. The error signal BS 206 in FIGS. 10A-10C is the voltage at output 182 of amplifier 148 which is supplied to scan amplitude control logic 184.

It is to be noted that the graphs 10A-10D also represent the waveforms generated by the dual sensor system 30 shown in FIG. 2.

In this respect any positional departure of the "mark" 21 (FIG. 2) from the true center of scan 12 will generate a pair of displacement data signal waveforms identical to waveform 202, for pseudo sensor Sa, and 204, for pseudo sensor Sb, (180° out of phase with 202) in amplifiers 48 and 50 and as shown in FIG. 10B or FIG. 10D. The summation of these waveforms will produce the error control voltage 60 in the summation amplifier 52 having a frequency of f1, the scan frequency and a phase relationship that is 180° apart for mark displacement movement either "in" or "out" beyond the center axis 12.

In FIG. 11 are shown graphs of this characteristic where graphs j, k, l are for marks having a 4:1 ratio in width but enjoy an essentially constant displacement gain characteristic. Graphs m, n, p and r show the relative change of loop gain for non-pitch-match scan target combinations.

The parameters for graphs j, k, l, m, n, p and r are as follows:

| Graph | SA | LW | PM |
|-------|-------|-------|-----|
| j | 0.010 | 0.010 | yes |
| k | 0.020 | 0.020 | yes |
| l | 0.040 | 0.040 | yes |
| m | 0.020 | 0.010 | no |
| n | 0.040 | 0.020 | no |
| p | 0.060 | 0.040 | no |
| r | 0.080 | 0.010 | no |

Referring again to FIG. 9, tapped analog delay line 152 shows a system of 16 summed output taps per pitch-matched pseudo sensor. This number of taps is a convenience and in no means is the system 110 to be restricted to this number of taps—a lesser or greater number of taps can be utilized per pseudo sensor.

Further the scanning resistors comprising resistor banks 161 and 162 are of identical value, to give the equivalence of a rectangular weighted summation network. The Hamming values for each resistor comprising resistor banks 161 and 162 could also be incorporated to reduce some of the higher values of harmonic of the pseudo sensor's output—as utilized in the Mohan, et al. prior U.S. Pat. No. 4,373,135.

For the delay system of FIG. 6 the width of a single sensor 88 should be equal to or less than the width of a mark to be scanned, as in the system 70 where a delayed means of achieving a null voltage is used.

In the full pseudo system of FIG. 9, in order to ensure that an undesirable situation of exceedingly high positional servo gain is not inadvertently created by having the effective scan amplitude width exactly equal to the width of the effective mark width, to generate a pseudo pair of sensors 16, 16' or 116, 116', equivalent of a spatial pair of match sensors in PM mode wherein the Scan Amplitude is approaching zero, it is best to require the scan amplitude mark width dial 202 to be set to a definite amplitude value slightly greater than the "mark width" to give an effective known servo gain characteristic for each setting thereby to provide a finite gain characteristic for all width marks utilized for positioning or a secondary servo gain dial can be provided for selectable setting of one of a family of gain characteristics which are the same for any mark width so set in. Since, in the pseudo system 110, S' the sensor width and can be as little as 0.005". The effective scan amplitude SA should be no less than twice the sensor width plus the mark line width to ensure a finite gain characteristic.

Accordingly, to dial in a selectable servo gain, this dial could modify the scan amplitude by a selected additional width.

Multiple line pairs of pseudo sensors can be utilized on multiple mark targets, to gain further noise filtering, if required, as in multi-line pair arrays of the prior art systems for linear scanning.

A method of adapting a multiplicity or bank array of fixed very narrow width sensors, all situated in a linear, self-scanning array, such as a sensor array known as "The Reticon Series" into a Pitch-Matched Cyclic Scanning System, is shown schematically in FIGS. 12A and 12B.

The previous utilization of the Pitch-Match Cyclic Scanning techniques as disclosed herein were based upon a single sensor or dual sensor array situated within a wand whose axis of scan served as the mechanical reference null position of the indicia mark and whose effective mechanical optical scan of that indicia mark was at right angles or normal to that indicia long axis.

With the advent of modern technology and the development of self-scanning linear arrays, the cyclic mechanical scanning wand can be replaced by a fixed bi-directional self-scanning linear array 220 (FIG. 12A), having as few as 64 sensing elements 221 or as many as 4096 sensing elements 221 per direction of scan, all confined within a very small package.

FIG. 12B shows two linear arrays, 220a, 220b, fixed in space having its center or center axis 222 of active array utilized as the center of null reference axis 222, so imaged upon a mark indicia 224 by a lens 226 and at right angle to the indicia mark positional direction of correction as to detect and correct any misposition of the mark indicia 224 from the sensor array fixed axis 222 of reference by a bi-directional cyclic scanning of a linear array.

It is to be noted here that a source of illumination not shown is directed toward the mark indicia and reflected or scatter light (or the lack thereof) is sensed by the sensing elements 221.

The utilization of the dual or bi-directional self-scanning linear arrays 220a and 220b to generate the equivalent of the prior described mechanical cyclic optical scanner and whose output is directly application to the control of an A.C. servo system or D.C. system, function is described below:

First of all, FIG. 12A graphically depicts a pair of 64 element self-scanned arrays 220 centered over the mark 222 of having a width LW. The total array (N1 to N64) is so imaged on the mark scan area as to represent a capture window width of 0.10"(for this example).

A scanning system 230 utilizes the arrays 220a and 220b is shown in FIG. 12B. Since many components of the system 230 are identical to components in the system 110 shown in FIG. 9, the same reference numerals are used for the same components.

An oscillator 232 supplies scan logic control 234 with a synchronous single phase, hi-speed clock signal, to generate a scan. An internal counter in the logic control 234 will establish a 60 cycle scan of the array (both forward and backward) by setting the array clock frequency to the appropriate frequency of $2 \times 60 \times 64 = 7680$ cycle per second. The start of the scan logic control 234 is supplied by the counter therein. The sequential analog 120 cy. output data of the two arrays 220a and 220b are serially outputted, to a signal conditioner 236, comprising low pass filter and amplitude control for proper operation of the storage delay line 152. The data bits are recombined in the delay line 152 to effect a pseudo pair of scanning sensors as described for FIG. 9.

Once first (or coarse) null is centered within the wide scan of 64 elements of the arrays 220a and 220b the mark width dial 210 having been set to match the mark width LW will effect a very high speed scan of elements #1 through N, then normal speed 60 cps scan through the (N+1) element of 221 through to (N+Pn) element of 221 and then very high speed scan of elements (N+Pn+1) through to element #64. The reverse scan of array 220b would be the reverse scanning of element by the array 220b. This would effect a narrow aperture scan amplitude equivalent to the match of the mark indicia (LW+2 element of the array).

A two phase clock of delay line 152 via a two phase generator 238 would have the same relationship to the scan data as in the system 110 shown in FIG. 9 and is so adapted to this by counting down the high speed common clock signal from oscillator 232 by dividing by N counter 240.

The above description of a bidirectional self-scanning linear array or dual array of FIGS. 12A and 12B involves construction of the system 230 to stimulate the identical type of scan data as generated by a mechanical, sinusoidal, spatial scanner.

Without sacrificing the inherent accuracy of this bidirectional system of dynamic scanning an area for mark positioning, the method shown in FIGS. 12A and 12B can be reduced to a single unidirectional self-scanning linear array.

If the second array 220b is eliminated and we just forward scan with the first array 220a as described for the complete forward scan system, then one will feed just this data into the delay line 152 to develop the pseudo pair of sensors and their output data. In this way,, one will develop a dual train of output data as illustrated in graphs 3A–3D in FIG. 3 for the mark centered. Any deviation of the mark from center will result in a phase sensitive sub-harmonic control signal by the addition of these waveforms as in FIG. 3C.

Rather than a reverse scan back through the array, the system would rapidly recycle for another forward scan. Thus, insuring a multiplicating of successive forward scans whose mark error displacement data will be derived from the differential summations of the two pseudo data train as graphically shown in FIG. 3C.

Although the systems 30, 70, 110 and 230 have been described utilizing the electromagnetic spectrum for positioning control systems, it is to be understood that other suitable means, such as magnetic, acoustic, etc., can be utilized.

From the foregoing description, it will be apparent that the systems 30, 70, 110 and 230 of the present invention have a number of advantages, some of which have been described above and others of which are inherent in the invention. Also, from the foregoing description, it will be apparent that modifications can be made to the system 30, 70, 110 or 230 of the present invention without departing from the teachings of the invention. Accordingly, the scope of the invention is only to be limited as necessitated by the accompanying claims.

I claim:

1. A method for quickly and accurately positioning a workpiece, which is situated on a movable platform and which has at least one indicia mark thereon having a different sensitivity to a sensing means than an adjacent contrast area, to a position where the indicia mark is in registry with a registration axis, said method comprising the steps of:

effecting a scan of a sensing means transverse to the registration axis in the area on said workpiece through which said registration axis extends with sensing means that are capable of generating electrical signals related to what is sensed;

providing in said sensing means a sensor system;

processing the electrical signals generated by said sensor system in a manner whereby some of the signals are treated as the scan data of a first sensor and the other of the signals are treated as the scan data of a second sensor;

setting the effective width of the sensor system at rest to a value which is no greater than slightly greater than the width of said indicia mark;

setting the amplitude of the scan which is effected transversely of the indicia mark when the indicia mark is close to the registration axis to be equal substantially to one sensor with about a center axis of said sensing means;

setting the center axis of said sensing means in registration with said registration axis;

setting the PITCH, namely the area to be scanned by the sensor system to MATCH substantially the scan amplitude plus the effective width of one sensor;

combining the scan signals designated as being the signals of a first sensor with the scan signals designated as being the signals of a second sensor to generate an error correction signal;

supplying said error correcting signal to means for controlling movement of aid platform to move said platform an incremental amount; and repeating the above steps until the error correction signal is at a null indicating registration of the indicia mark with said registration axis.

2. The method of claim 1 including the step of utilizing the scan signals designated as being the signals of the first sensor or of the second sensor to generate an error voltage validation signal.

3. The method of claim 1 including the step of providing two sensors of equal width in said sensor system.

4. The method of claim 1 including the step of providing one sensor in said sensor system having a width substantially equal to one-half of the width of the indicia mark.

5. The method of claim 1 including the step of providing one sensor in said sensor system having a width substantially less than the width of the indicia mark.

6. The method of claim 1 including the step of effecting the scanning by reciprocating said sensing means across the area of said workpiece through which said registration axis extends transversely from the workpiece.

7. The method of claim 6 including an initial step of scanning through a large scan to capture the indicia mark and then scanning through a small scan equal to the PITCH MATCH scan.

8. The method of claim 1 including the step of providing said sensing means with a thin sensor having a width substantially less than the width of the indicia mark, said scanning being effected by reciprocating said thin sensor across the indicia mark on said registration axis, and said processing of said electrical signals being effected by supplying the forward scan signals and reverse scan signals to a delay line having a plurality of output taps, connecting the output taps to two resistor banks, the output of one resistor bank establishing the scan data of a first pseudo sensor and the output of the other bank establishing the scan data of a second pseudo sensor, followed by combining the scan data of the first and second pseudo sensors to generate the error correction signal.

9. The method of claim 1 including the step of providing said sensor means with two stationary arrays of sensor elements extending across the area of said registration axis, and said step of effecting a scan including sequentially electrically reading the contrast sensed by each sensor element in a central area of each array in a forward scan and a reverse scan.

10. The method of claim 9 wherein said processing of electrical signals is effected by supplying the sequentially read electrical signals from each array to a delay line, connecting the output taps of the delay line to two resistor banks, the output of one resistor bank establishing the scan data of a first pseudo sensor and the output of the other bank establishing the scan data of a second pseudo sensor, followed by combining the scan data of the first and second pseudo sensors to generate the error correction signal.

11. The method of claim 1 including the step of providing said sensor means with one stationary array of sensor elements extending across the area of said registration axis, one said step of effecting a scan including the step of sequentially electrically reading the contract sensed by each sensor element in a central area of said array in a forward scan and a reverse scan.

12. The method of claim 11 wherein said processing of electrical signals is effected by supplying the sequentially read electrical signals from said array to a delay line, connecting the output taps of the delay line to two resistor banks, the output of one resistor bank establishing the scan data of a first pseudo sensor and the output of the other bank establishing the scan data of a sensor pseudo sensor, followed by combining the scan data of the first and second pseudo sensors to generate the error correction signal.

13. The method of claim 1 wherein said sensing is an optical sensing and said method further comprises the steps of:

illuminating said workpiece in the area of said registration axis; and said effecting of a scan comprises scanning reflected light from the area on said workpiece through which said registration axis extends with optical sensing means that are capable of generating electrical signals related to the reflected light sensed.

14. An apparatus for quickly and accurately positioning a workpiece, which is situated on a movable platform and which has at least one indicia mark thereon having a different sensitivity to a sensing means than an adjacent contrast area, to a position where the indicia mark is in registry with a registration axis, said apparatus comprising:

sensing means;

means for effecting a scan of said sensing means transverse to the registration axis in the area on said workpiece through which said registration axis extends, said sensing means being capable of generating electrical signals related to what is sensed and including a sensor system;

means for processing the electrical signals generated by said sensor system in a manner whereby some of the signals are treated as the scan data of a first sensor and the other of the signals are treated as the scan data of a second sensor;

means a value which is for setting the effective width of the sensor system to a value which is no greater than slightly greater than the width of said indicia mark;

means for setting the amplitude of the scan which is effected transversely of the indicia mark when the indicia mark is close to the registration axis to be substantially equal to one sensor width and about a center axis of said sensing means;

the center axis of said sensing means being in registration with said registration axis;

means for setting the effective area to be scanned by a single sensor the PITCH, to MATCH substantially the scan amplitude plus one sensor with;

means for combining the scan signals designated as being the signals of the first sensor with the scan signals designated as being the signals of the second sensor to generate an error correction signal; and means for supplying said error correction signal to means for controlling movement of said platform to move said platform an incremental amount.

15. The apparatus of claim 14 including means for utilizing the scan signals designated as being signals of a first sensor or of a second sensor to generate an error voltage validation signal.

16. The apparatus of claim 14 wherein said sensor system includes two sensors of equal width.

17. The apparatus of claim 14 wherein said sensor system includes one sensor having a width substantially equal to one-half of the width of the indicia mark.

18. The apparatus of claim 14 wherein said sensor system includes one real or pseudo sensor having a width substantially less than the width of the indicia mark.

19. The apparatus of claim 14 wherein said means for effecting scanning includes means for reciprocating said sensing means across the area of said workpiece through which said registration axis extends transversely of the registration axis.

20. The apparatus of claim 18 including means for scanning through a large scan to capture the indicia mark prior to scanning through a small scan equal to the PITCH MATCH scan.

21. The apparatus of claim 14 wherein said sensing means includes a thin sensor having a width substantially less than the width of the indicia mark, said means for effecting scanning includes means for reciprocating said thin sensor across the indicia mark and said registration axis, and said means for processing said electrical signals includes a delay line of having a plurality of output taps;

means for supplying the forward scan signals and reverse scan signals to said delay line;

means for connecting two resistors banks said output taps to said two resistor banks, the output of one resistor bank establishing the scan data of a first pseudo sensor and the output of the other bank establishing the scan data of a second pseudo sensor; and means for supplying the outputs of said resistor banks to said means for combining the scan data of the first and second pseudo sensors to generate the error correction signal.

22. The apparatus of claim 14 wherein said sensor means includes two stationary arrays of sensor elements extending across the area of said registration axis, and said means for effecting a scan including means for sequentially electrically reading the contrast sensed by each sensor element in a central area of each array in a forward scan and a reverse scan.

23. The apparatus of claim 22 wherein said means for processing electrical signals includes a delay line having a plurality of output taps;

means for supplying the sequentially read electrical signals from each array to said delay line;

two resistor banks;

means for connecting said output taps of said delay line to said two resistor banks, the output of one resistor bank establishing the scan data of a first pseudo sensor and the output of the other bank establishing the scan data of a second pseudo sensor; and means for supplying the outputs of said two resistor banks to said means for combining the scan data of the first and second pseudo sensors to generate the error correction signal.

24. The apparatus of claim 14 wherein said sensor means includes one stationary array of sensor elements extending across the area of said registration axis, and said means for effecting a scan includes means for sequentially electrically reading the contrast sensed by each sensor element in a central area of said array in a forward scan and a reverse scan.

25. The apparatus of claim 24 wherein said means for processing electrical signals includes a delay line having a plurality of output taps;

means for supplying the sequentially read electrical signals from said array to said delay two resistor banks;

means for connecting said output taps of said delay line to said two resistor banks, the output of one resistor bank establishing the scan data of a first pseudo sensor and the output of the other resistor bank establishing the scan data of a second pseudo sensor, and means for supplying the outputs of said resistor banks to said means for combining the scan data of the first and second pseudo sensors to generate the error correction signal.

26. The apparatus of claim 14 wherein said sensing means is an optical sensing means, said apparatus further comprises means for illuminating said workpiece in the area of said registration axis and said means for effecting a scan comprises optical scanning means for scanning reflected light from the area of said workpiece through which said registration axis extends.

27. The apparatus of claim 14 further including means for setting the positional servo gain characteristics and means for modifying the width of scan by the selectable, settable servo gain characteristic control parameters.

28. The method of claim 7 further including the steps of: setting the positional servo gain characteristics, and modifying the PITCH MATCH scan by the selectable, settable servo gain characteristic control parameters.

* * * * *

UNITED STATES PATENT AND TRADEMARK OFFICE
CERTIFICATE OF CORRECTION

PATENT NO. : 4,827,140
DATED : May 2, 1989
INVENTOR(S) : William L. Mohan, Barrington, Illinois It is certified that error appears in the above-identified patent and that said Letters Patent is hereby corrected as shown below:

Column 7, Line 7 "to the" should be --to image the--

Column 15, Line 53 "correcting" should be --correction--

Column 15, Line 54 "aid" should be --said--

Signed and Sealed this

First Day of December, 1992

Attest:

DOUGLAS B. COMER

*Attesting Officer*     *Acting Commissioner of Patents and Trademarks*